United States Patent Office

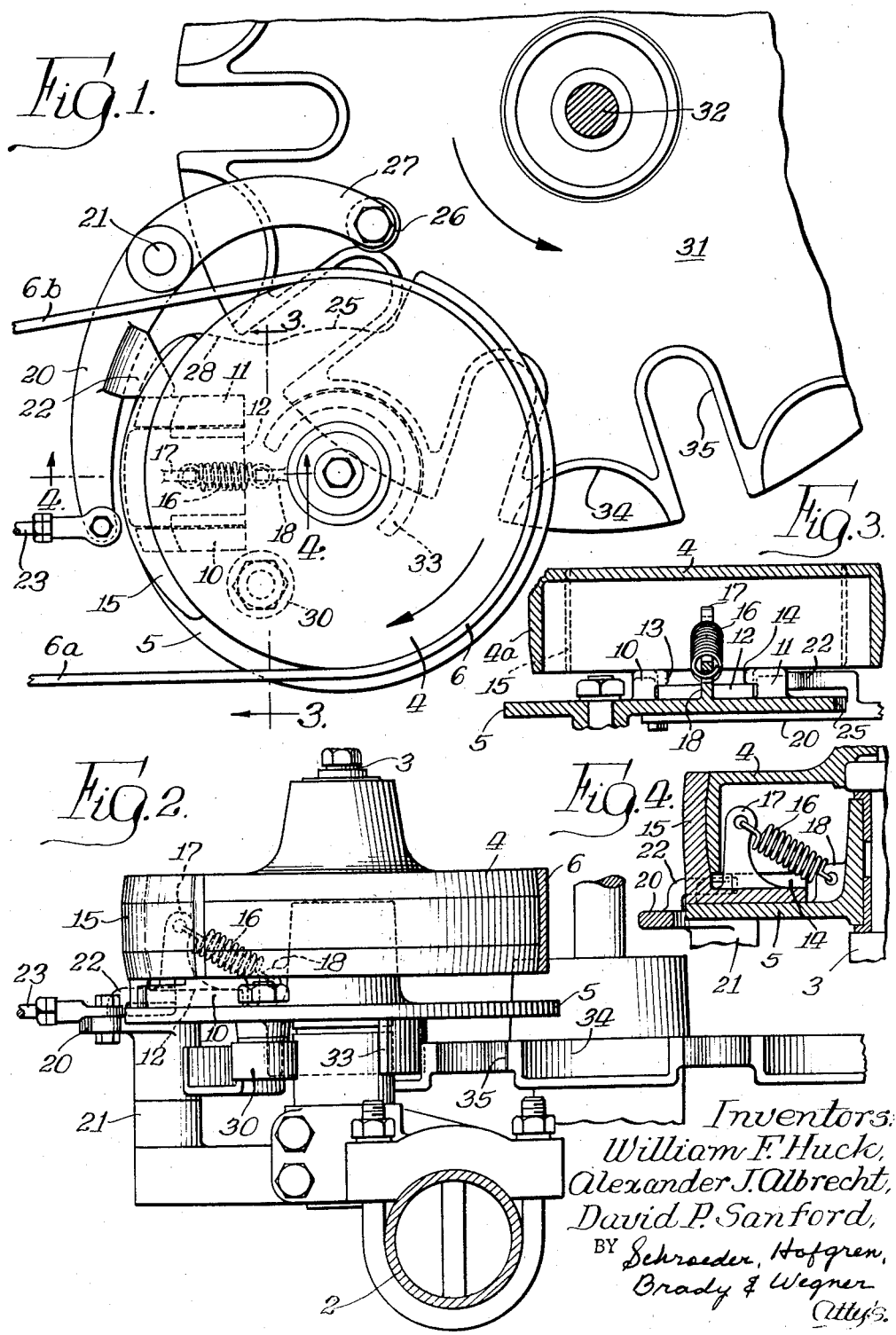

2,911,079
Patented Nov. 3, 1959

2,911,079

CLUTCH

William F. Huck, Forest Hills, N.Y., and Alexander J. Albrecht, Teaneck, and David P. Sanford, Union, N.J., assignors to The Brunswick Automatic Pinsetter Corporation, a corporation of Delaware Application November 12, 1957, Serial No. 695,555

8 Claims. (Cl. 192—3.5)

This invention relates to a clutch and more particularly to a one-revolution friction clutch.

An object of this invention is to provide a new and improved clutch which starts with minimum force and which is reliable, of low-cost simple construction, relatively immune to wear and wherein wearing parts are easily replaced.

Another object of the invention is to provide a clutch having a driving member and a driven member and a clutch member in frictional engagement with the driving member whereby release of the clutch member permits all the members to rotate together with the clutch member moving into captured relation between the driving member periphery and a means engageable with the driving member periphery for imparting rotation thereto.

Another object of the invention is to provide a one-revolution clutch having a driving belt or band with a driving pulley disposed in a loop thereof, a driven member rotatably mounted co-axially with the driving pulley, a clutch mounted on the driven member for movement radially thereof and having an arcuate flange shaped to frictionally engage a section of the driving pulley periphery, means for urging the flange toward the pulley periphery, and releasable detent means engageable with the driven member to hold the clutch adjacent a portion of the pulley periphery free of said belt whereby release of the driven member permits the clutch and driven member to commence rotation with the driving pulley by frictional contact between the clutch flange and the driving pulley periphery and continued rotation of the parts carries the clutch flange into captured relation between the pulley periphery and the belt to provide a more nearly positive drive, and means for resetting said detent means to engage the driven member upon the completion of a revolution thereof to hold said driven member against further movement.

A further object of the invention is to provide a one-revolution clutch as defined in the preceding paragraph which may be associated with a Geneva gear and having a Geneva driver on the driven member and means on the driven member for holding the Geneva gear against movement when the driver and gear are out of contact with each other.

Further objects and advantages will become apparent from the following detailed description taken in connection with the accompanying drawings in which:

Fig. 1 is a plan view of the clutch associated with a fragmentary view of mechanism driven thereby;

Fig. 2 is a front view in elevation of the clutch and mechanism driven thereby;

Fig. 3 is a vertical section taken generally along the line 3—3 in Fig. 1;

Fig. 4 is a vertical section taken generally along the line 4—4 in Fig. 1.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated. The scope of the invention will be pointed out in the appended claims.

A clutch supporting framework indicated generally at 1 may be attached to a supporting rod 2 and the framework supports a shaft 3 on which a driving member in the form of a driving pulley 4 may be rotatably mounted. The shaft 3 also rotatably supports a driven member in the form of a disc 5 positioned beneath the driving pulley 4.

The driving pulley 4 is mounted within the loop of a driving band such as driving belt 6 which has lengths 6a and 6b extending from opposite sides of the driving pulley 4. The belt 6 engages an arc of the pulley periphery 4a. The belt 6 is driven from a power source (not shown) and the driving pulley is continuously rotated thereby.

The driven disc 5 has a pair of guide flanges 10 and 11 on one face thereof for slidably confining a clutch member therebetween for movement radially of the disc 5. The clutch member has a base 12 slidable between the flanges and is held therein by turned-over edges 13 and 14 on the flanges. The clutch member has an arcuate flange 15 upstanding from the base 12 and this flange has a length and is shaped to engage a substantial arc of the pulley periphery. The clutch member flange 15 frictionally engages the driving pulley periphery 4a and is urged into engagement therewith by a spring 16 connected between an upstanding lug 17 formed on the clutch member base 12 and a lug 18 formed on one face of the driven disc 5. This frictional engagement is sufficient to cause the clutch member and the driven disc 5 to rotate with the driving pulley 4 when free to do so. This is controlled by a movable detent means comprising an arm 20 pivoted at 21 and having a detent 22 positioned to selectively engage the rib 11 formed on the driving disc 5 in one position thereof and in a withdrawn position to release said engagement. The arm 20 may be moved to withdraw the detent 22 by a pull on link 23 connected to operating mechanism (not shown). The detent 22 is located to hold the clutch member in a position free of engagement with the driving belt 6.

In operation, a pull on link 23 moves the detent 22 out of engagement with rib 11 and the frictional contact between the clutch member flange 15 and driving pulley periphery 4a is sufficient to cause the driven disc 5 to rotate with the driving pulley. As viewed in Fig. 1, after a fraction of a revolution of the driven disc 5 the clutch member flange 15 will move into captured relation between the driving pulley periphery 4a and the driving belt 6 to provide a more nearly positive drive for the driven disc 5. The driven disc 5 has a section of its periphery relieved as shown at 25 to permit movement of the arm 20 by permitting inward movement of a cam follower roller 26 mounted on an arm 27 integral with the arm 20. The relieved section 25 connects with a cam 28 whereby rotation of the driven disc 5 will cause the cam 28 to engage the roller 26 and reset the detent 22 in position to engage the rib 11. Thus the driven disc 5 will rotate for one revolution and will stop when the rib 11 engages the repositioned detent 22. This will occur when the clutch member flange 15 is no longer captured by the belt 6.

The driven disc 5 has a Geneva driver 30 extending from its face opposite the clutch member for driving a Geneva gear 31 mounted for rotation on a shaft 32 by engagement with one of the slots 35. A semi-circular flange 33 is also formed on the driven disc 5 to interfit with one of several correspondingly shaped surfaces 34 on the Geneva gear 31 to prevent over-running of the Geneva gear.

When the driven disc 5 begins to rotate as previously described, the Geneva driver 30 will travel toward one of the slots 35 formed in the Geneva gear and when the driver 30 enters this slot 35, the clutch member flange 15 will have been captured to provide the necessary force to rotate the Geneva gear 31. At this time the semicircular flange 33 will be out of locking relation with the correspondingly shaped surface 34 on the Geneva gear.

The clutch structure herein disclosed starts with a minimum force and holds the Geneva gear in both directions of rotation and allows for quick replacement of a worn driving belt, when necessary, by simply sliding the belt off the driving pulley 4.

We claim:

1. A one-revolution clutch comprising, a driving belt having a loop, a driving pulley mounted in said loop and having the belt in engagement with an arc of its periphery for rotating said pulley, a selectively driven disc mounted for rotation coaxially with said pulley, a clutch member slidably mounted between guide flanges on one face of said disc for movement radially thereof and having an arcuate flange with the same curvature as the pulley periphery to fit against the pulley periphery, a spring connected between the disc and the clutch member for constantly urging the clutch member radially inward and the arcuate flange against the pulley periphery, a movable detent member at the level of said disc positioned to engage one of the guide flanges and movable between a first position to hold the disc against movement and the arcuate flange in a position out of contact with the belt and a second position permitting movement of the disc, whereby the pulley causes the disc to rotate by engagement between the arcuate flange and pulley periphery and the arcuate flange is subsequently captured between the belt and the pulley, and means for resetting the detent member in its first position to limit the disc to a single revolution.

2. A one-revolution clutch as defined in claim 1 for driving a Geneva gear wherein the disc has a Geneva driver on the face thereof opposite the clutch member which contacts the gear when the clutch flange is captured, and means on the disc coacting with the Geneva gear to hold the Geneva gear against overrunning when the detent member engages the disc guide flange to stop the clutch.

3. A clutch comprising, a driving belt having a loop, a driving pulley mounted in said loop and having the belt in engagement with a portion of its periphery, a driven disc mounted for rotation coaxially with said pulley, a clutch member mounted on the disc for sliding movement radially thereof and having an arcuate flange curved to fit against the pulley periphery, and a spring for urging the clutch member radially inward and the flange against the pulley.

4. A clutch comprising, a driving pulley, a driving belt looped around part of the driving pulley periphery, a driven member mounted coaxially with the driving pulley, a clutch member movably mounted on the driven member and having an arcuate flange lying adjacent a portion of the pulley periphery, means urging the flange into frictional contact with the pulley periphery, and releasable means for the clutch member whereby disengagement of said last mentioned means permits rotation of the clutch and driven member with the pulley and the clutch member during part of its rotation is captured between the belt and driving pulley.

5. A clutch comprising, a rotatable driving member, a driving band looped around part of the driving member periphery for rotating said driving member, a driven member mounted coaxially with the driving pulley, a clutch member movably mounted on the driven member and having a part lying adjacent a portion of the driving member periphery, means urging said part into frictional contact with the driving member, and means for releasably holding the clutch member and driven member against rotation with the driving member.

6. In a clutch mechanism, a driven member for selectively rotating a device, and means for selectively rotating said driven member and commencing said rotation with minimum force applied to said driven member comprising, a driving pulley, a continuously traveling driving belt looped about the pulley and engaging a portion of the periphery thereof, a clutch member in frictional engagement with said driving pulley periphery, and means for releasably holding said clutch member in a position adjacent an arc of the pulley free of said belt whereby release of said clutch member permits the clutch member to travel with the pulley by frictional engagement therewith and subsequently be captured between the belt and pulley.

7. A clutch mechanism comprising, a driven member, a driving member coaxial with the driven member, means engageable with the periphery of the driving member for continuously rotating said driving member, and means mounted on said driven member and frictionally engaging the driving member periphery whereby the driven member travels with the driving member and said last mentioned means may be captured between the driving member and the driving member rotating means to impart a more nearly positive drive to the driven member, and means for releasably holding the driven member against movement.

8. A clutch comprising a continuously traveling belt and pulley driven by the belt, an intermittently operable driven member mounted for rotation coaxially with the pulley, and a clutch member for selectively driving the driven member with the belt and pulley and engageable between the belt and pulley.

No references cited.